(12) United States Patent
Thermos

(10) Patent No.: US 8,605,715 B2
(45) Date of Patent: Dec. 10, 2013

(54) SYSTEM AND METHOD FOR DETECTING VULNERABILITIES IN VOICE OVER IP NETWORKS

(76) Inventor: Panayiotis Thermos, Farmingdale, NJ (US)

( * ) Notice: Subject to any disclaimer, the term of this patent is extended or adjusted under 35 U.S.C. 154(b) by 1341 days.

(21) Appl. No.: 11/556,146

(22) Filed: Nov. 2, 2006

(65) Prior Publication Data

US 2007/0097963 A1    May 3, 2007

Related U.S. Application Data

(60) Provisional application No. 60/596,991, filed on Nov. 2, 2005.

(51) Int. Cl.
*H04L 12/66* (2006.01)

(52) U.S. Cl.
USPC .......................................................... 370/356

(58) Field of Classification Search
None
See application file for complete search history.

(56) References Cited

U.S. PATENT DOCUMENTS

| | | | | |
|---|---|---|---|---|
| 5,668,880 | A * | 9/1997 | Alajajian | 370/342 |
| 5,933,413 | A * | 8/1999 | Merchant et al. | 370/234 |
| 7,222,255 | B1 * | 5/2007 | Claessens et al. | 714/4.12 |
| 7,577,738 | B1 * | 8/2009 | Inglis et al. | 709/224 |
| 2002/0087885 | A1 * | 7/2002 | Peled et al. | 713/201 |
| 2003/0051163 | A1 * | 3/2003 | Bidaud | 713/201 |
| 2004/0001443 | A1 * | 1/2004 | Soon et al. | 370/244 |
| 2005/0015667 | A1 * | 1/2005 | Aaron | 714/25 |
| 2005/0050377 | A1 * | 3/2005 | Chan et al. | 714/4 |
| 2005/0144445 | A1 * | 6/2005 | Yeap et al. | 713/168 |
| 2006/0031522 | A1 * | 2/2006 | Soulhi et al. | 709/227 |
| 2006/0242701 | A1 * | 10/2006 | Black et al. | 726/22 |
| 2007/0019559 | A1 * | 1/2007 | Pittelli et al. | 370/248 |

* cited by examiner

*Primary Examiner* — Yong Zhou
(74) *Attorney, Agent, or Firm* — Tarter Krinsky & Drogin LLP

(57) ABSTRACT

A computer system and method for discovering voice over IP networks and detecting related vulnerabilities. The user identifies target servers or a network representing several targets to scan, and the system scans the specified servers to identify which support voice over IP services. The system returns a list of servers identified, and the user can export the list to the scanner. The scanner allows the user to specify scan options and then initiate a scan against specified servers or a network. The system performs the scan based on the scan options specified by the user, and displays the scan results to the user, such as one or more vulnerabilities found on the specified servers. The user can prioritize and categorize the collected data based on configurable settings. The user can also send a particular type of message to a voice over IP network and see the result.

20 Claims, 16 Drawing Sheets

VOIP SCANNER - REPORT

THIS REPORT WAS GENERATED ON TUESDAY JUNE 15 19:00 37 EDT 2006

178

SUMMARY OF FINDINGS

| RISK LEVEL | NUMBER OF FINDINGS |
|---|---|
| HIGH | 24 |
| MEDIUM | 0 |
| LOW | 0 |
| INFORMATIONAL | 0 |

FINDINGS DETAIL

.13  [INFORMATIONAL] : CHECK NO [0001]
DESCRIPTION
RECOMMENDATION   SERVER. SIP EXPRESS ROUTER (0.8.10 (1335/LINUX))

.14  [INFORMATIONAL] : CHECK NO [0001]
DESCRIPTION
RECOMMENDATION   SERVER. SIP EXPRESS ROUTER (0.8.10 (1336/LINUX))

.13  [HIGH] : CHECK NO [10002.5]
DESCRIPTION   THIS CHECK VARIFIES THE ABILITY OF THE UA TO HANDLE 5000 AS THE USERNAME IN A URI USING THE REGISTERED REQUEST OVER VOP. IT APPEARS THAT THE TARGET UA COULD NOT HANDLE SIP REQUESTS (OVER UDP) OF 5000 AS THE USERNAME IN THE URL IN A REGISTER REQUEST. ENSURE THE UA CAN ACCEPT MALICIOUS REQUESTS THAT CONTAIN 5000 CHARACTERS AS THE USERNAME.
RECOMMENDATION

.13  [HIGH] : CHECK NO [10003.0]

FIG. 11

VOIP VULNERABILITY SCANNER

SCANNER CONTROL PANEL | SCANNER CONFIGURATION | SIP MESSAGE GENERATOR | SIP COMPONENT DISCOVERY

SIP MESSAGE — 193

| METHOD | TRANSPORT | USER | DOMAIN/HOST | PORT |
|---|---|---|---|---|
| REGISTER ▼ | TCP ▼ | ALICE : | @ 192.168.1.3 | 6060 |

VIA: SIP/2.0/TCP 192.4.245.19 BRANCH IGHG4BK7
TO: ROOT<SIP:ROOT@192.4.245.19>
FROM: ROOT<SIP:ROOT@192.4.245.19> LEG=192830
AUTHENTICATION:
CALL-ID: A94B4C76C66710
CSEQ: 123456 REGISTER
CONTACT: <SIP:ROOT@192.4.245.19>
RECORD-ROUTE:
SUBJECT: TEST
CONTENT-TYPE: APPLICATION
USER AGENT: SCANNER
EXPIRES: 7200   MAX-FORWARD: 70   CURRENT LENGTH: 0

☑ USE SDP?   SDP MESSAGE — 194
V=0
O=USER 29739 7272939 IN IP4 192.4.245.19
S=
C-IN IP4 192.4.245.19
M=AUDIO 49210 RTP/AVP 0 12
M=VIDEO 3227 RTP/AVP 31

COPIES [1]   [ SEND ] — 196

CONVERSATION LOG — 197

REGISTER: SIP 192.168.1.3 SIP 2.0
VIA: SIP2.0/TCP 192.4.245.19; BRANCH=IGHG4BK7
FROM: ROOT < SIP.ROOT@192.4.245.19>
CALL-ID: A94B4C76C66710@192.168.1.2
CSQ: 123456 REGISTER
CONTACT: <SIP.ROOT@192.4.245.19>
USER AGENT: SCANNER
CONTENT TYPE: APPLICTION
SUBJECT: TEST
EXPIRES: 7200
CONTENT LENGTH: 0

SP/2.0 200 OK
VIA SP/2.0/TCP
192.4.245.19, BRANCH=IGHG4BK;
RECEIVED=192.16.1.1.2
FROM ROOT <SIP.ROOT@192.4.245.19>
TAG=1923301774
...<PORTIONS OMITTED>...
WARNING 392.192.166.1,3:5050 "NOISY FEEDBACK TESTS"

MESSAGE GENERATION PROGRESS   [========] 100%

VOIP VULNERABILITY SCANNER

SCANNER CONTROL PANEL | SCANNER CONFIGURATION | SIP MESSAGE GENERATOR | SIP COMPONENT DISCOVER

SIP MESSAGE

| METHOD | TRANSPORT | USER | | DOMAIN/HOST | PORT |
|---|---|---|---|---|---|
| INVITE ▾ | UDP ▾ | ALICE | @ | 192.168.1.3 | 6060 |

VIA: SIP/2.0/UDP 192.168.1.3 BRANCH IGHG4BK7
TO: ALICE@192.168.1.3
FROM: ROOT<SIP:ROOT@192.168.1.3>  LEG=192830
AUTHENTICATION:
CALL-ID: A94B4C76C66710
CSEQ: 123456 INVITE
CONTACT: <SIP:ROOT@192.168.1.3>
RECORD-ROUTE:
SUBJECT: TEST
CONTENT-TYPE: APPLICATION/SCLP
EXPIRES 7200  MAX-FORWARD: 70  CURRENT LENGTH 0

USE SDP? ☐

SDP MESSAGE
V=0
O=USER 29739 7272939 IN IP4 192.168.1.3
S=
C-IN IP4 192.168.1.3
M=AUDIO 49210 RTP/AVP 0 12
M=VIDEO 3227 RTP/AVP 31

COPIES 1     [ SEND ]

CONVERSATION LOG

VIA SP/2.0/UDP 192.168.1.3,IGHG4BK7
TO: ALICE@192.168.1.3
FROM: ROOT
<SIP:ROOT@192.168.1.3>TAG=1920301774
CSEQ: 123456 INVITE
CALL-ID: A94B4C76C66710@192.4.241.18
MAX_FORWARD: 70
DATE: THU JUN 24 14:28:01 EDT 2006
CONTENT TYPE: APPLICATION/SCLP
SUBJECT: TEST
EXPIRES: 7200
SIP/2.0 100 TRYING—YOUR CALL IS IMPORTANT TO US
VIA: SIP/2.0/UDP 192.168.1.3,IGHG4BK7
TO: ALICE@192.168.1.3
FROM: ROOT <SIP:ROOT@192.168.1.3>TAG-1920301774
CSQ: 123456 INVITE
CALL-ID: A94B4C76C66710@192.168.1.3
SERVER: SIP EXPRESS ROUTER (0.8.10 (I386/
WARNING: 392 192.168.1.3:5060 "NOISY..."

MESSAGE GENERATION PROGRESS  100%

SYSTEM AND METHOD FOR DETECTING VULNERABILITIES IN VOICE OVER IP NETWORKS

CROSS-REFERENCE TO RELATED APPLICATION

This application claims the benefit of U.S. Provisional Application No. 60/596,991, filed Nov. 2, 2005, which application is incorporated herein in its entirety.

BACKGROUND

The Public Switch Telecommunication Network (PSTN) was built without anticipating the threats that we face today, from malicious users to foreign governments and terrorist groups who aim in compromising or disrupting the national telecommunications infrastructure at the appropriate time. The Common Channel Signaling System 7 is a set of protocols that are used in the PSTN to setup and tear down communications between subscribers. The SS7 was developed without security objectives in mind (i.e. confidentiality, integrity, availability) that can help protect against attacks that can be realized today. Packet based networks, such as the Internet, are known to have vulnerabilities due to lack of security objectives as well. The difference is that the Internet is accessible by anyone who has connectivity through an Internet Service Provider. With the PSTN, however, access to the core network is restricted to the carriers or service providers who are typically commercial organizations with financial objectives in mind, rather than the objective of generating attacks against subscribers or networks. As such, the convergence between circuit switch (SS7) and packet based (i.e. Internet) networks raises several concerns. An attack against a Signaling Gateway, the demarcation point between IP and SS7 based networks, can cause unexpected conditions to occur. Thus, the risk of an attacker sending specially crafted messages from an IP network to an SS7 network increases. Accordingly, a need currently exists for systems and methods for detecting security vulnerabilities in networks that use voice over IP communications. Such need also exists for NGN (Next Generation Networks) and IMS (IP Multimedia Subsystem).

SUMMARY

Various technologies and techniques are disclosed for detecting vulnerabilities.

Unique systems and methods are disclosed for detecting vulnerabilities in voice over IP networks, Next Generation Networks and IMS Networks (IP Multimedia Subsystem).

Various technologies and techniques are disclosed for allowing a user to discover components that support communications in voice over IP networks and detect related security and/or reliability vulnerabilities. The user identifies one or more target systems to scan, and the system scans the specified target systems to identify which of them have voice over IP service implemented or identify systems that support VoIP services. The target systems can be end user devices such as VoIP phones or network elements such as, but not limited to, a signaling gateway, a softswitch or a media gateway, media conferencing server (voice and video) and session border controllers (SBC). The system returns a list of the targets identified, and the user can export the list of voice over IP targets to the scanner. The scanner allows the user to specify one or more scan options and then initiate a scan against one or more specified servers. The system performs the scan based on the scan options specified by the user, and displays the scan results to the user, such as one or more vulnerabilities found on the specified VoIP components (servers or end user devices). The user can also interact atomicaly with a VoIP component by sending individual messages that are crafted according to the user's specifications and observe the behavior of the target component.

Yet other forms, implementations, objects, advantages, benefits, features, and aspects of the present invention will become apparent from the detailed description and drawings contained herein.

BRIEF DESCRIPTION OF THE DRAWINGS

FIG. 11 is a simulated screen of one implementation of the system of FIG. 3 showing a report generated as a result of a scan.

FIG. 13 is a simulated screen of one implementation of the system of FIG. 3 showing the results of a message that was sent.

FIG. 14 is a simulated screen of one implementation of the system of FIG. 3 showing the results of an INVITE message that was sent.

DETAILED DESCRIPTION

Figure 1:
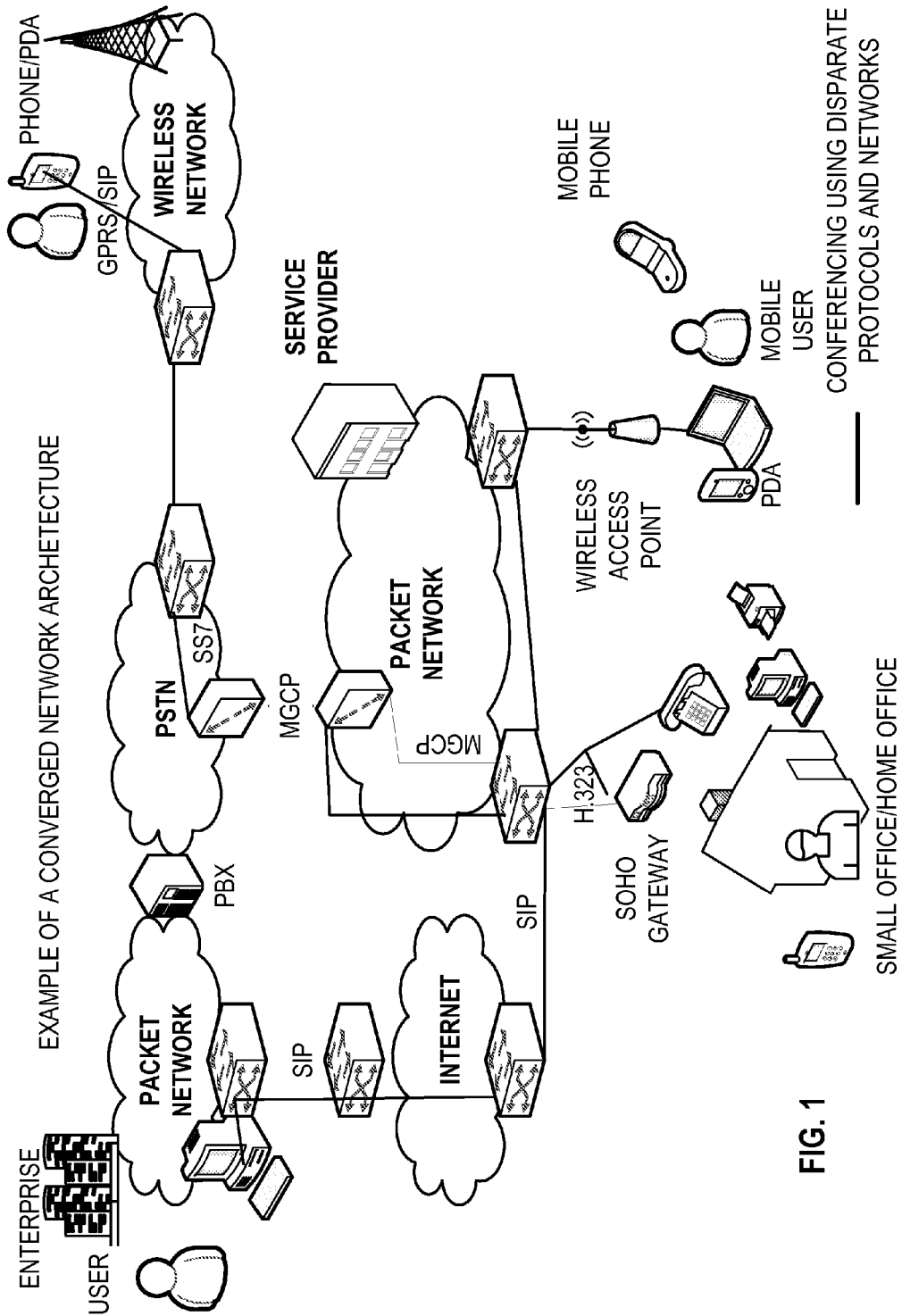
FIG. 1 is a diagrammatic view of a converged network.

For the purposes of promoting an understanding of the principles of the invention, reference will now be made to the implementations illustrated in the drawings and specific language will be used to describe the same. It will nevertheless be understood that no limitation of the scope is thereby intended. Any alterations and further modifications in the described implementations, and any further applications of the principles of the implementations as described herein are contemplated as would normally occur to one skilled in the art to which the invention relates.

The SS7 protocol used by Public Switched Telephone Networks (PSTN) was designed with no security controls in mind. As such, threats that have emerged the past two decades associated with Telecommunications and Cyberwarfare threaten the reliability of the PSTN, especially in converged networks. FIG. 1 provides a high level representation of a converged network.

Figure 2:
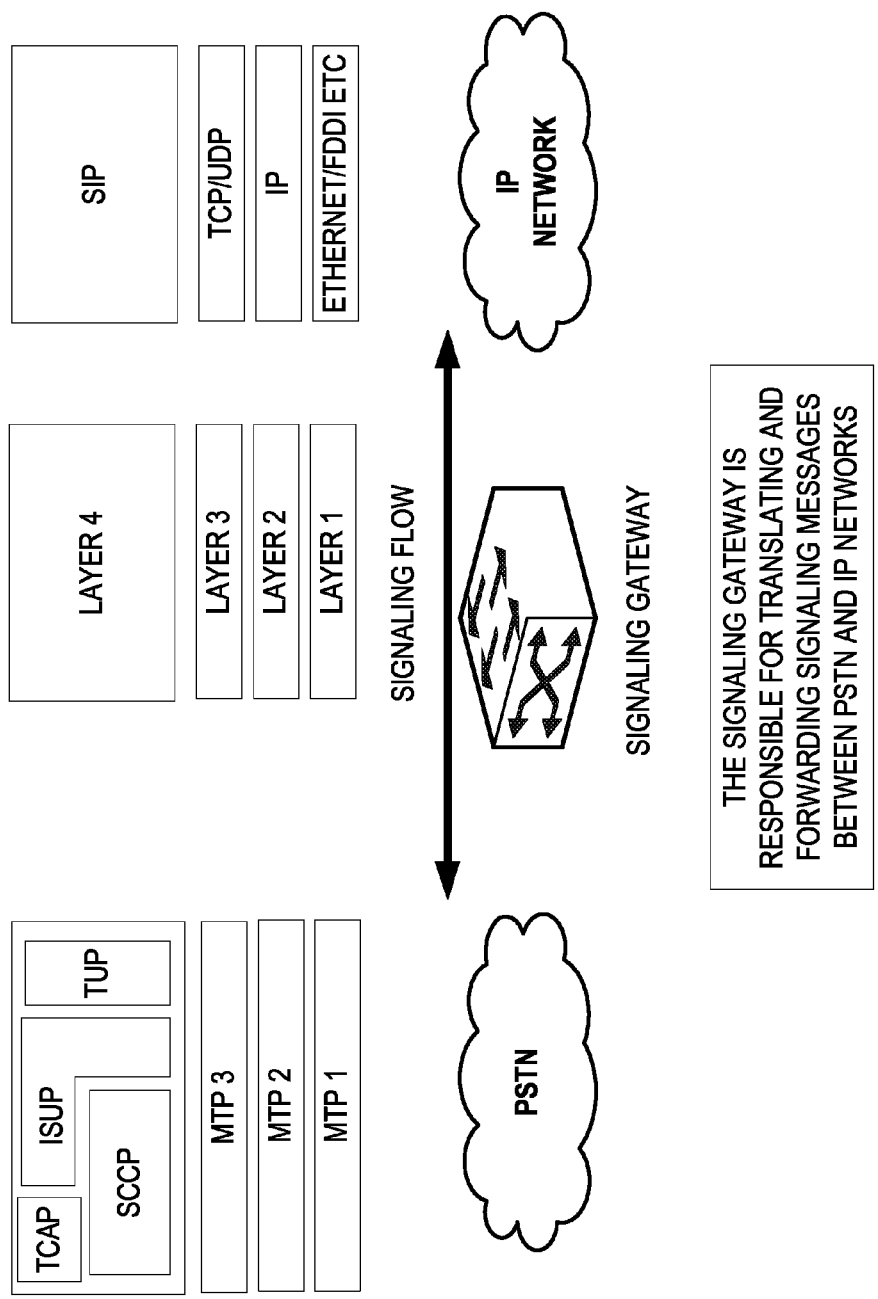
FIG. 2 is a diagrammatic view of the logical mapping between SS7 and IP/SIP networks.

One important component in a converged network is the signaling gateway. The signaling gateway is responsible for translating signaling messages between two or more networks, such as PSTN and internet-protocol (IP) based networks. FIG. 2 illustrates this configuration along with the logical mapping between SS7 and IP/SIP. The IP protocol was designed for data applications whereas SS7 was designed for Telecommunications. As such, the mapping between the SS7 and IP/SIP protocols complicates the call flows in converged networks which in turn raise concerns regarding attacks associated with IP based networks such as service disruption, message manipulation and spoofing. These attacks may propagate in the SS7 network and have adverse effects.

Figure 3:
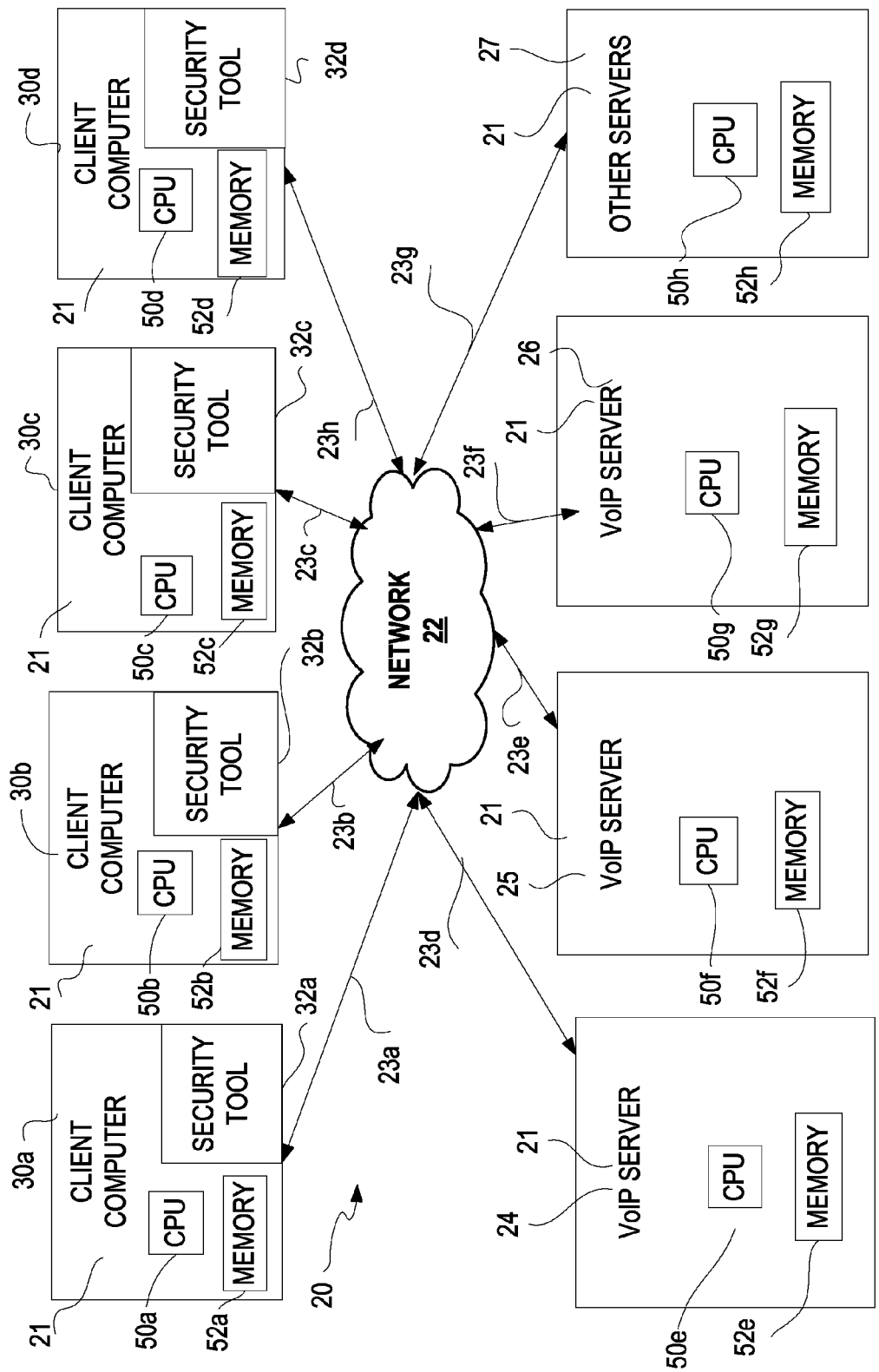
FIG. 3 is a diagrammatic view of a computer system of one implementation.

FIG. 3 is a diagrammatic view of computer system 20 of one implementation that provides a security tool for identifying vulnerabilities in converged telephone networks with voice over IP or networks which use only VoIP technologies. In one implementation, system 20 can be used with Next Generation Networks (NGN), Voice Over IP (VoIP) networks, and IP Multimedia Subsystem (IMS) networks. Many of the non-limiting examples discussed herein talk about voice over IP networks, but the technologies and techniques discussed herein could also be used with NGN and IMS networks in other implementations.

Computer system 20 includes computer network 22. Computer network 22 couples together a number of computers 21 over network pathways 23a-f. More specifically, system 20 includes several servers, namely VoIP Servers 24, 25, and 26, and Other Servers 27. System 20 also includes client computers 30a, 30b, 30c, and 30d (collectively 30). While computers 21 are each illustrated as being a server or client, it should be understood that any of computers 21 may be arranged to include both a client and server. Furthermore, it should be understood that while eight computers 21 are illustrated, more or fewer may be utilized in alternative implementations.

Computers 21 include one or more processors or CPUs (50a, 50b, 50c, 50d, 50e, 50f, 50g, and 50h, respectively) and one or more types of memory (52a, 52b, 52c, 52d, 52e, 52f, 52g, and 52h, respectively). Each memory 52a, 52b, 52c, 52d, 52e, 52f, 52g, and 52h preferably includes a removable memory device. Each processor 50a-50h may be comprised of one or more components configured as a single unit. Alternatively, when of a multi-component form, a processor 50a-50h may have one or more components located remotely relative to the others. One or more components of each processor 50a-50h may be of the electronic variety defining digital circuitry, analog circuitry, or both. In one implementation, each processor 50a-50h is of a conventional, integrated circuit microprocessor arrangement, such as one or more PENTIUM III or PENTIUM 4 processors supplied by INTEL Corporation of 2200 Mission College Boulevard, Santa Clara, Calif. 95052, USA.

Each memory 52a-52h (removable or generic) is one form of a computer-readable device. Each memory may include one or more types of solid-state electronic memory, magnetic memory, or optical memory, just to name a few. By way of non-limiting example, each memory may include solid-state electronic Random Access Memory (RAM), Sequentially Accessible Memory (SAM) (such as the First-In, First-Out (FIFO) variety or the Last-In-First-Out (LIFO) variety), Programmable Read Only Memory (PROM), Electronically Programmable Read Only Memory (EPROM), or Electrically Erasable Programmable Read Only Memory (EEPROM); an optical disc memory (such as a DVD or CD ROM); a magnetically encoded hard disc, floppy disc, tape, or cartridge media; or a combination of any of these memory types. Also, each memory may be volatile, nonvolatile, or a hybrid combination of volatile and nonvolatile varieties.

Although not shown to preserve clarity, in one implementation each computer 21 is coupled to a display and/or includes an integrated display. Computers 21 may be of the same type, or a heterogeneous combination of different computing devices. Likewise, displays may be of the same type, or a heterogeneous combination of different visual devices. Although again not shown to preserve clarity, each computer 21 may also include one or more operator input devices such as a keyboard, mouse, track ball, light pen, and/or microtelecommunicator, to name just a few representative examples. Also, besides a display, one or more other output devices may be included such as a loudspeaker or printer. Various display and input device arrangements are possible.

Computer network 22 can be in the form of a wireless or wired Local Area Network (LAN), Municipal Area Network (MAN), Wide Area Network (WAN), such as the Internet, a Public Switched Telephone Network (PSTN), a combination of these, or such other network arrangement as would occur to those skilled in the art. The operating logic of system 20 can be embodied in signals transmitted over network 22, in programming instructions, dedicated hardware, or a combination of these. It should be understood that more or fewer computers 21 can be coupled together by computer network 22.

In one implementation, system 20 operates at one or more physical locations where VoIP components 24, 25, and 26 have implemented VoIP protocols and services that provide IP-multimedia services such as VoIP, where Other Servers 27 provide services other than voice over IP communications, and where at least one of client computers 30a-30d are configured for providing a security tool 32a-32d, respectively, for scanning one or more of servers 24, 25, 26, and/or 27 to determine whether they are voice over IP enabled and to identify related security vulnerabilities. Security tool 32a-32d of client computers 30a-30d can be a standalone application, an installable application such as one that communicates with a server, can be browser-based, can be a thick or smart client, and/or can be embedded software, to name a few non-limiting examples. In one implementation, software installed locally on client computers 30a-30d are used to communicate over network 22 with servers 24, 25, 26, and/or 27 to detect whether the respective server offers voice over IP services and if so, whether it has one or more voice over IP security vulnerabilities.

Typical applications of system 20 would include more or fewer client computers 30a-30d of this type at one or more physical locations, but four have been illustrated in FIG. 3 to preserve clarity. Furthermore, although four servers 24, 25, 26, and 27 are shown, it will be appreciated by those of ordinary skill in the art that the one or more features provided by servers 24, 25, 26, and/or 27 could be provided by the same computer or varying other arrangements of computers at one or more physical locations and still be within the spirit of the invention. Farms of dedicated servers could also be provided to support the specific features if desired.

Figure 4:
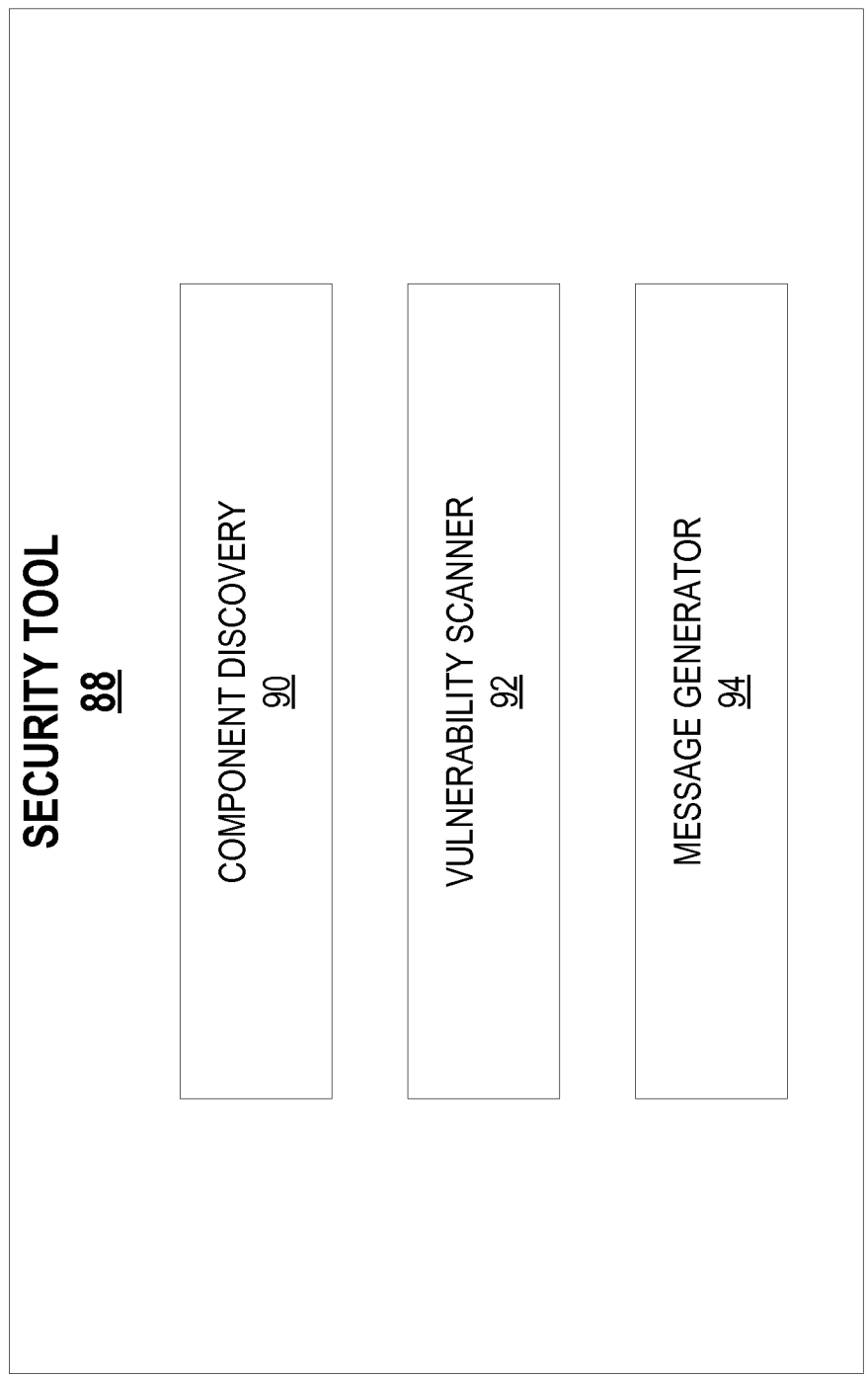
FIG. 4 is a diagrammatic view of a security tool of one implementation.

FIG. 4 is a diagrammatic view of a security tool 88 of one implementation of system 20. Security tool 88 (32a-32d on FIG. 3) on one or more of client computers 30a-30d includes component discovery module 90, vulnerability scanner module 92, and message generator module 94. In one implementation, component discovery module 90 scans a range of IP addresses to identify hosts which use the SIP protocol and can be used as targets for further analysis. In one implementation, there is an option in the configuration scanner which allows preliminary discovery of targets prior to an actual scan. The discovery interface is typically used as a precursor to a scan to ensure that the appropriate targets should be scanned. Other uses of this feature are possible.

In one implementation of the invention, vulnerability scanner module 92 provides flexible configuration of several options which can be used to verify the robustness and security of a SIP implementation. In one implementation of the invention, one or more of the following checks are performed using scanner module 92:

Generation and response analysis of various SIP and SDP messages according to user specifications to identify vulnerabilities such as, but not limited to, buffer overflows, call re-routing (hijacking), or denial of service attacks. These checks can be selected and configured with variable values, by the user.

Authentication of signaling messages by the SIP component under analysis.

Authentication of registration requests.

Inspection for secure communications (SIPS) and encryption capabilities

The scanner provides a user friendly report using formats such as HTML and/or multiple arrangements and views of the data collected after a scan including maintaining a history of scanning sessions.

The user has also the ability to save messages from the activity log that are generated during a scanning session for later analysis.

In one implementation of the invention, message generator module 94 can be used to send various types of messages to a SIP component including SDP content. This feature can be used to test specific issues with SIP or generate various attacks for demonstration purposes (e.g. DoS, registration masquerading). Turning now to FIGS. 5-14, each of these modules of system 20 will now be described in further detail.

One implementation for implementing system 20 is illustrated in flow chart form as procedure 100, which demonstrates one form of implementing component discovery module 90. In one form, procedure 100 is at least partially implemented in the operating logic of system 20. Procedure 100 begins on FIG. 5 at start point 102 with the user specifying one or more target networks to scan (i.e. servers by IP address). The user then selects a scan option (stage 104), and the system scans the specified networks to identify which of them are voice over IP networks (e.g. use the SIP protocol) (stage 106). The system then returns a list of the voice over IP networks that were identified (stage 108). The user can optionally export a list of the identified networks to use in the scanning module 92 (stage 110). The process then ends at end point 112.

Figure 5:
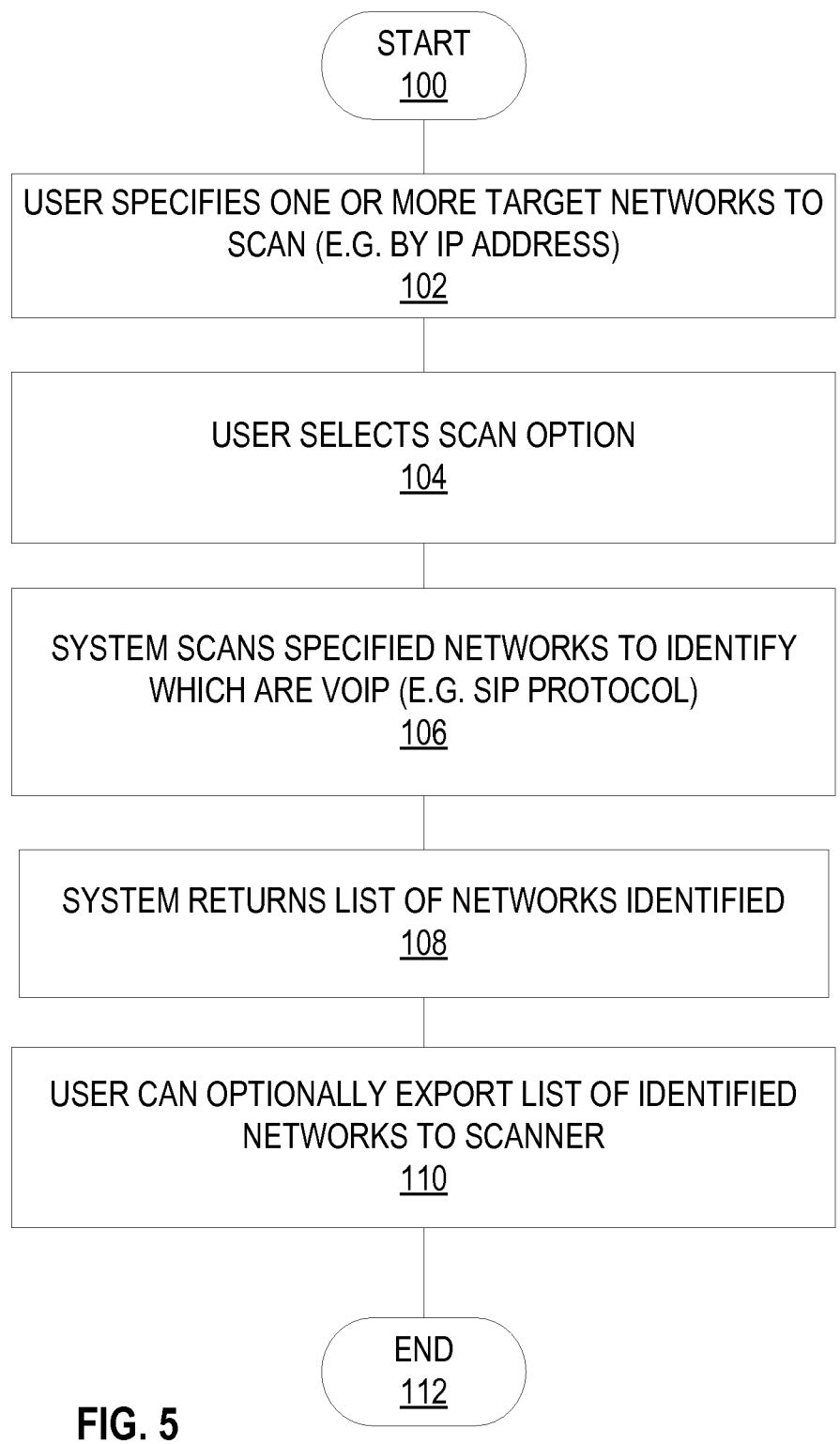
FIG. 5 is a process flow diagram for the system of FIG. 3 demonstrating the stages involved in discovering voice over IP components.
Figure 6:
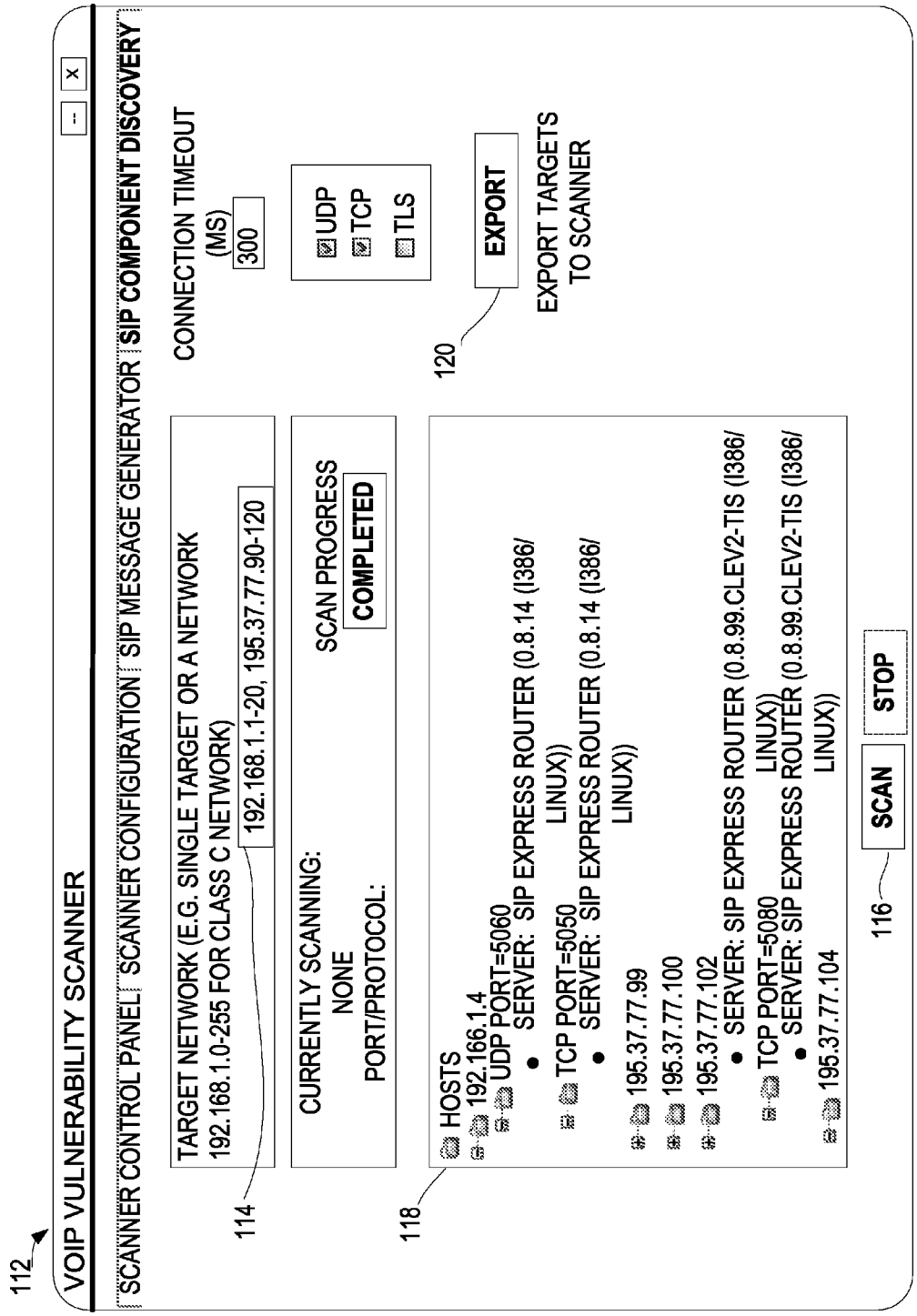
FIG. 6 is a simulated screen of one implementation of the system of FIG. 3 showing discovery of voice over IP components.

Turning now to FIG. 6 with continued reference to FIG. 5, a simulated screen 112 is shown for allowing a user to discover networks that use voice over IP. The user can specify the target networks to scan in field 114 (stage 102). In one implementation of the invention, the format of the target network field 114 is similar to the scanner's configuration, which is as follows:

192.168.1.3—a single IP address to scan.

192.168.1.3,192.168.1.4,192.168.5.10—scan three IP addresses (note that each address is separated by a comma)

192.168.1.1-255—scan the entire C-class 192.168.1.13-15—scan hosts between 13 and 15 inclusively 192.168.2-10.1-5—scan the B class between subnets 2 and 10 and hosts 1 through 5

The user has the ability to alter the connection timeout value in order to adjust to network performance requirements. As one non-limiting example, the utility allows scanning for UDP, TCP and/or TLS ports that are typically used by SIP components. The scanner provides the flexibility to scan using other protocols such as MGCP, H.323 or SCCP (Cisco's proprietary VoIP protocol). Upon selecting scan option 116 (stage 104), the system performs the scan (stage 106) and returns a list 118 of networks that use voice over IP (stage 108). The user can export a list of the identified networks using export option 120 (stage 110).

Figure 7:
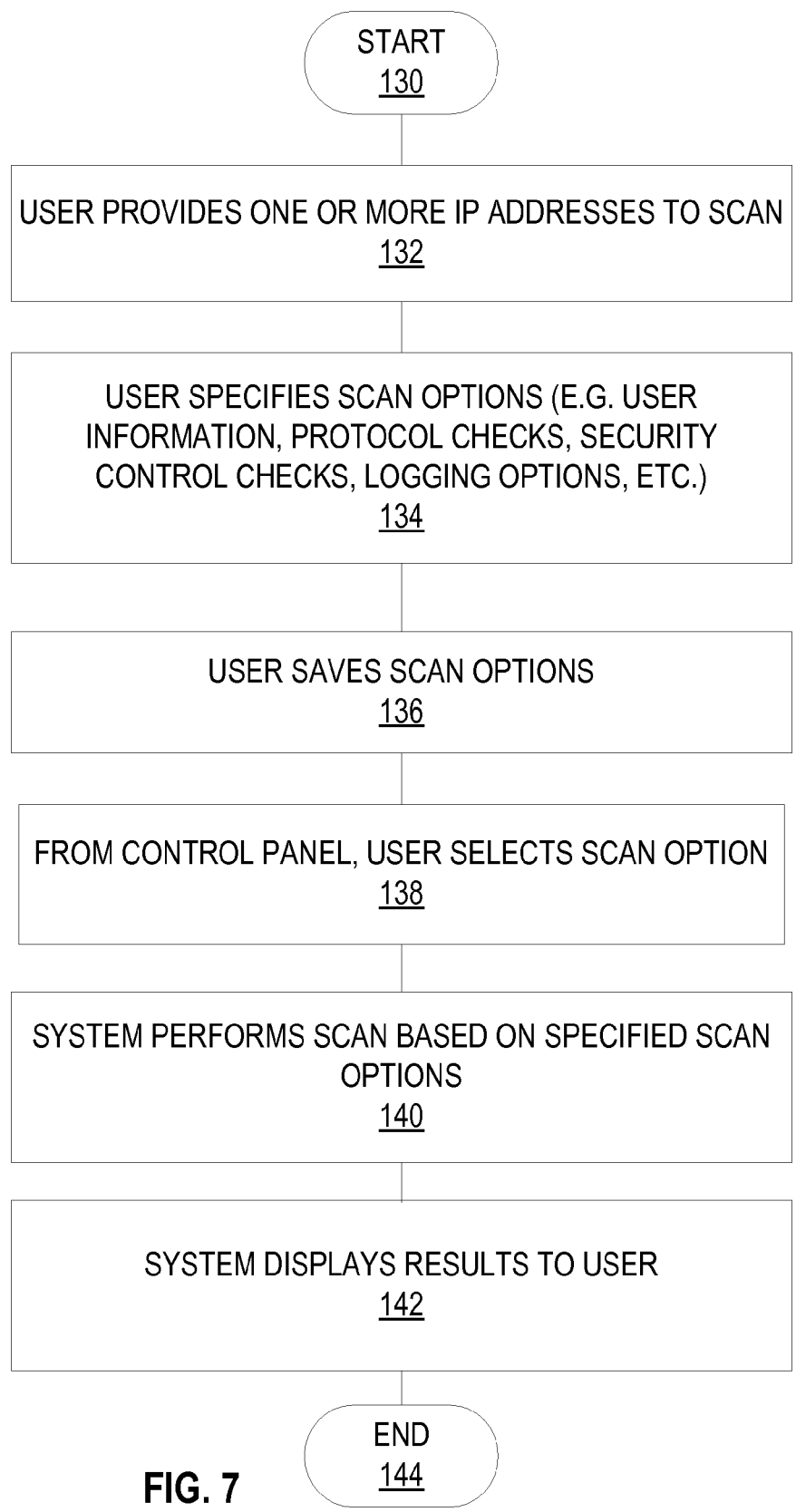
FIG. 7 is a process flow diagram for the system of FIG. 3 demonstrating the stages involved in scanning voice over IP networks for security vulnerabilities.

Referring now to FIG. 7, procedure 130 demonstrates one form of the more detailed stages of system 20 which involve scanning one or more specified voice over IP servers for security vulnerabilities. In one form, procedure 130 is at least partially implemented in the operating logic of system 20. Procedure 130 begins at start point 132 with the user providing one or more IP addresses to scan (stage 132). The user specifies one or more scan options, such as user information, protocol checks, security control checks, logging options, etc. (stage 134). The user then saves the scan options (stage 136). The user selects the scan option (stage 138) to initiate the scan, such as from the control panel. The system performs the scan based on the specified scan options (stage 140) and then displays the results of the scan to the user (stage 142). The process then ends at end point 144.

Figure 8:
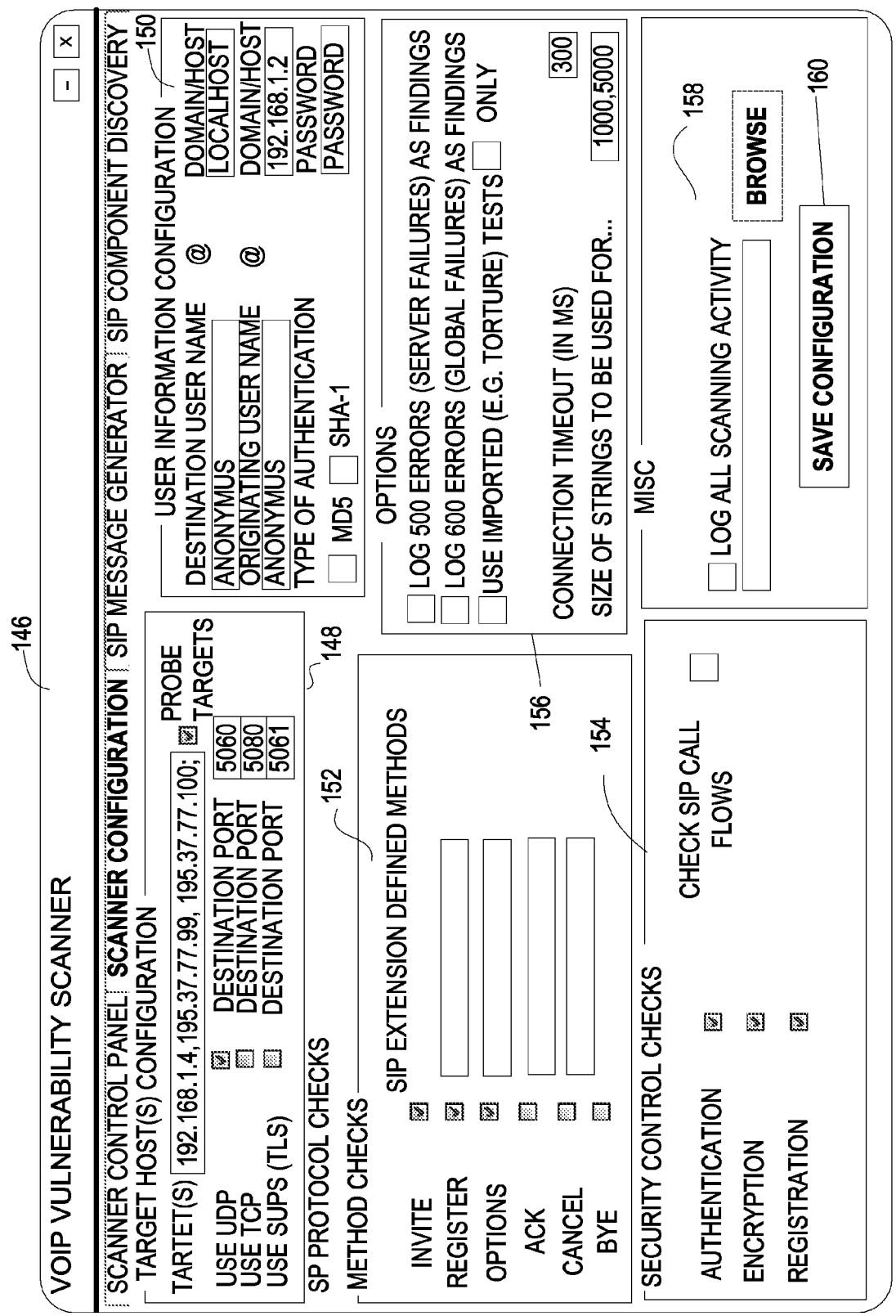
FIG. 8 is a simulated screen of one implementation of the system of FIG. 3 showing scanner configuration options.

A simulated example will now be described with reference to FIGS. 8-11 to illustrate the stages of FIG. 7 in further detail. One will appreciate that the sample scan and stages followed in this example are illustrative only and are not intended to be limiting in nature. Turning now to FIG. 8, a simulated screen 146 is shown that illustrates various scanner configuration options. Screen 146 includes target host information 148, user information configuration 150, method checks 152, security controls checks 154, options 156, and miscellaneous options 158. Screen 146 also includes save configuration option 160 for saving the settings when finished.

In order to initiate a scan the user provides a set of IP addresses or a single IP address of a host which is considered to be the target in the target host information section 148. In one implementation of the invention, the format of the IP addresses is as follows:

192.168.1.3—a single IP address to scan.

192.168.1.3,192.168.1.4,192.168.5.10—scan three IP addresses (note that each address is separated by a comma)

192.168.1.1-255—scan the entire C-class 192.168.1.13-15—scan hosts between 13 and 15 inclusively 192.168.2-10.1-5—scan the B class between subnets 2 and 10 and hosts 1 through 5

The scanner can perform vulnerability scans using UDP (the default medium for SIP), TCP and/or TLS for SIPS. The Probe Targets Option helps verify that the target host is a VoIP component (such as one using the SIP protocol) prior to initiating a scan against it. The ability to identify VoIP components that use the SIP protocol can be achieved by using the SIP Component Discovery function. This capability is extendable to other VoIP protocols such as, but not limited to MGCP, H.323 and SCCP. Furthermore, the user can change the server's destination port for each respective protocol (UDP, TCP and TLS). The default values for each protocol are pre-populated.

User information configuration section 150 gives the user the ability to populate the source and destination user information that will be used in the messages to be generated during a scan session. In one implementation, it is recommended that a target user is defined as the recipient of these messages (calls) in order to simulate various call flows and evaluate their security in order to identify vulnerabilities. The destination user name field identifies the user that will receive the messages generated by the scanner. The default values can be used but in certain cases it may be required to configure an existing user name in order to observe the behavior of the target VoIP components that are involved in the interaction and mediate the call flow. The destination domain/host field identifies the target domain that the scanner's messages should contain. The originating user name field identifies the user that supposedly is originating the messages. The default values can be used. However, in certain cases, such as where the VoIP network requires the authentication of messages, a valid user name and password should be defined in order allow the routing of the messages through the VoIP network and observe the behavior of the target host based on the test messages generated. The originating domain/host field identifies the domain that the messages are supposedly generated. This is not a required field but the same logic as the previous fields (i.e. destination user name) applies. The type of authentication option provides the ability to indicate what type of authentication digest should be used, if the target hosts are using authentication prior to processing any messages. Typically, MD5 is the common choice of message digest algorithm used, but the SHA-1 is also provided in case there are proprietary implementations of SIP stacks that may use this digest algorithm.

The scanner supports various SIP checks, including method checks 152 and security control checks 154. The user can select which methods are to be tested by selecting the desired methods within the method checks section 152. The scanner also provides the ability to incorporate additional methods that may be defined in other SIP extensions. Each method is tested for various vulnerabilities (e.g. buffer overflows, malformed messages) using combinations of the available header fields and parameters (username, Tag, Call-ID, etc.). The size of the strings for buffer overflow checks is defined in the Options section 156. This provides a unique capability to allow the user to generate variable size of test messages, dynamically.

For example, various combinations of malformed messages can be generated regressively for one of more of the methods check 152 and/or security control checks 154. For each message sent, an evaluation is performed on how that message was handled by the target host (i.e. VoIP component). After a malformed message is sent, the system waits for a response from the remote component. If a response is not received from the remote component within a certain amount of time (for example 400 seconds), then the system sends a good message to check whether the remote host is still operational. If after a certain amount of time, a response is not received to the good message, then another good message can optionally be sent. If a response to any of the good messages is received (but not to the malformed one), then the test case is flagged as a finding of "Medium" or another suitable level. If the system does not receive a response to the good message after a certain number of retries, then it flags the test case as a finding of "High", or another suitable level.

The scanner also supports security control checks 154 to check for the ability of the target components to perform the following:
    authentication of SIP messages
    registrations and
    encryption capabilities.

The scanner supports various options in options section 156, such as for logging global and server failures. To know when checks generate Global or Server errors, a user can select the respective checkbox (Log 500 errors and Log 600 errors). In certain cases, vulnerability checks may cause a Global or Server error which may have significant impact to the health of the target component. In one implementation, by default these two options are disabled. Another option is provided for using imported checks (e.g. torture checks). Torture checks can be imported (from the Control Panel) and then the scanner can send the checks to specified targets. In one implementation, the scanner provides the option to use imported checks, which can be useful when testing for SIP compliance. In addition, the user has the ability to alter the connection timeout value in order to adjust to network performance requirements. Furthermore, the user can configure the buffer overflow size. The user can specify the size of the strings that should be generated in order to check for buffer overflows, malformed messages and potential Denial of Service.

In the miscellaneous section 158 of scanner configuration screen 146, the user can specify an option to log all the messages send and received during a scanning section by selecting the log all scanning activity box. The user can click on the Save Configuration option 160 to save the current configuration to be used at a later time, such as by selecting it from the scanner's Control Panel.

Figure 9:
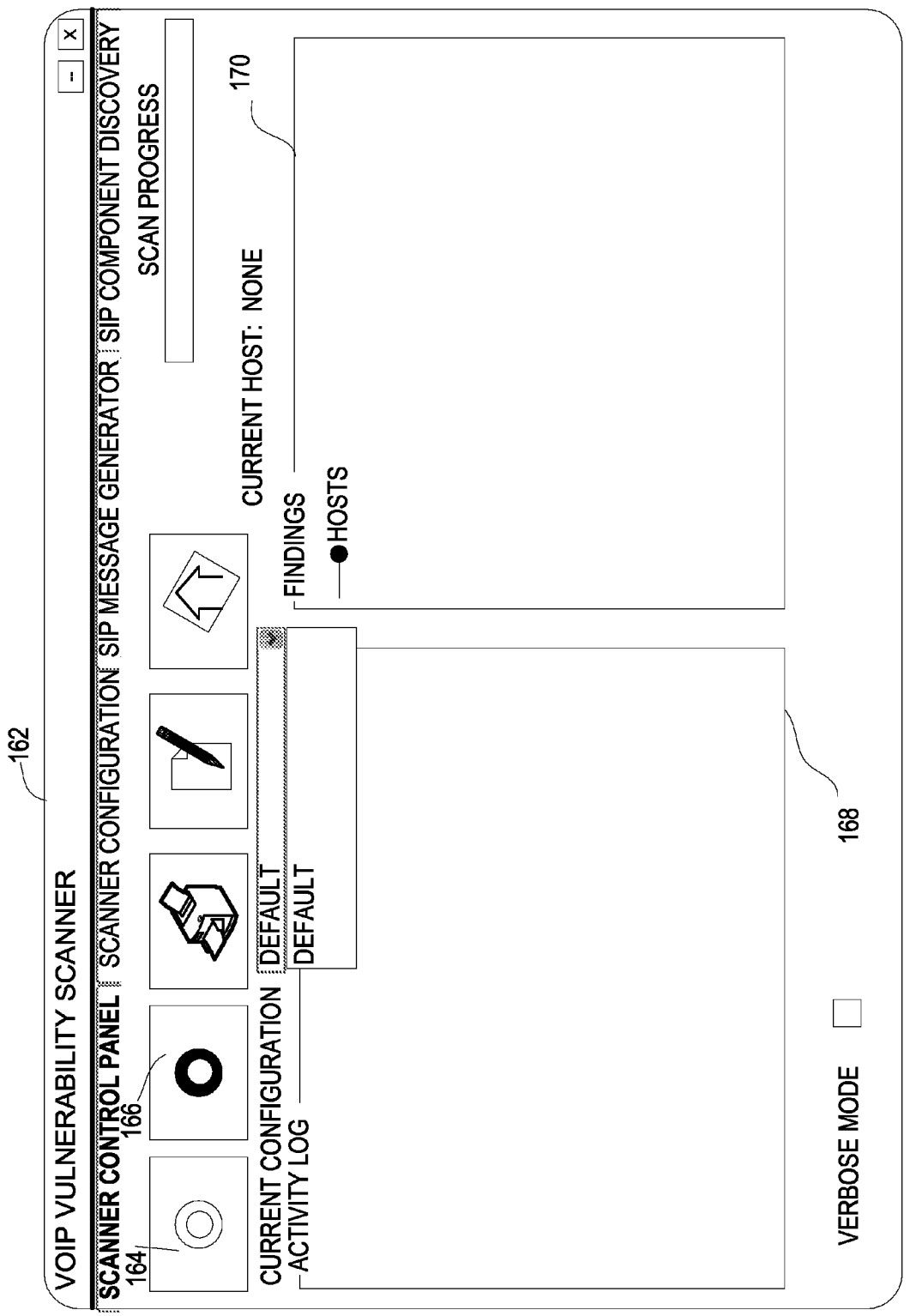
FIG. 9 is a simulated screen of one implementation of the system of FIG. 3 showing a control panel that allows initiation of a scan.

Turning now to FIG. 9, simulated screen 162 illustrates a control panel that allows the user to perform a scan based on saved configuration settings, such as those saved using screen 146 of FIG. 8. The scanner control panel provides the ability to initiate a scan 164, stop a scan 166, monitor the progress of a scan and generate reports. The scanner window 168 provides the user with the ability to monitor the progress of the scanner and messages sent and received (by checking the verbose mode check box at the lower left corner of the panel). In addition, vulnerabilities that are identified during the scan are listed under the findings panel 170, such as in a tree structure. The current configuration dropdown field allows the user to select which configuration to use for a scanning session. This ability can be useful in various scenarios. For example, the user can use the same configuration to scan multiple networks and maintain a consistency of the type of checks that are performed or maintain a historical record of the scanning session and the checks that were used. The user can save the activity log window by clicking on the "Activity Log" button. The user can import checks by clicking on the "Import Checks" button and have the scanner send the checks to specified targets. The scanner provides the option to use imported checks (selectable from the configuration panel) which can be useful when testing for SIP compliance. The Findings window 170 provides a preliminary display of the findings that the scanner has identified. In one implementation, this is integrated with an analysis module to recognize responses when torture tests are used. Once a scan is completed (or stopped), the user can click on the "printer" icon to generate a report. In one implementation, the report will be stored in a subdirectory "reports" under the scanner's directory, or at another location specified by the user.

Figure 10:
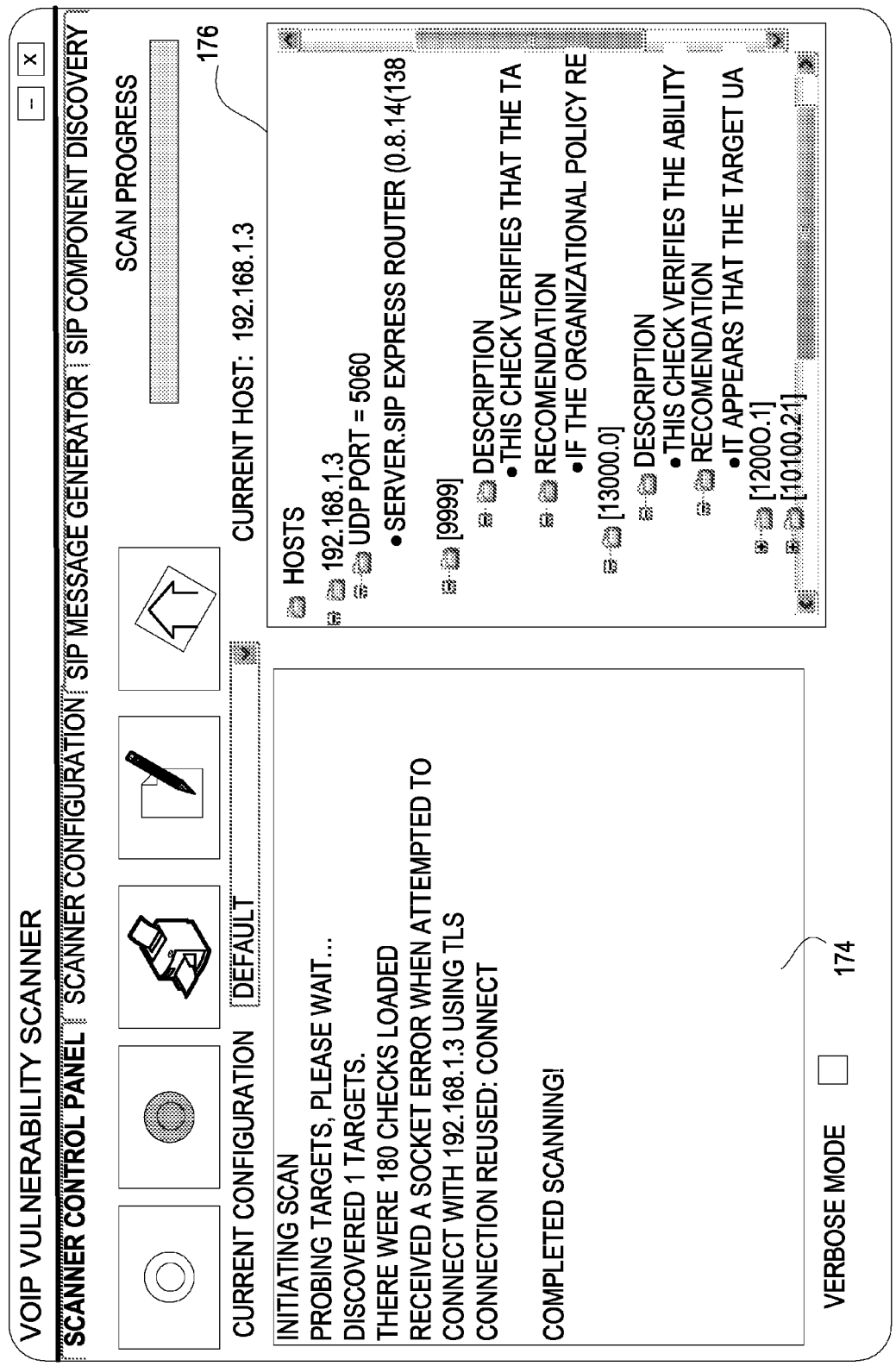
FIG. 10 is a simulated screen of one implementation of the system of FIG. 3 showing the results of a scan.

FIG. 10 illustrates a simulated screen 172 for a sample scan that has been run. The activity log 174 shows the activity, and the findings window 176 shows the results of the scan. FIG. 11 illustrates a sample report 178. Note that the first three octets of the IP address have been purposefully obfuscated. Report 178 illustrates the summary of the findings of the scan, plus recommended actions that should be taken.

Figure 12:
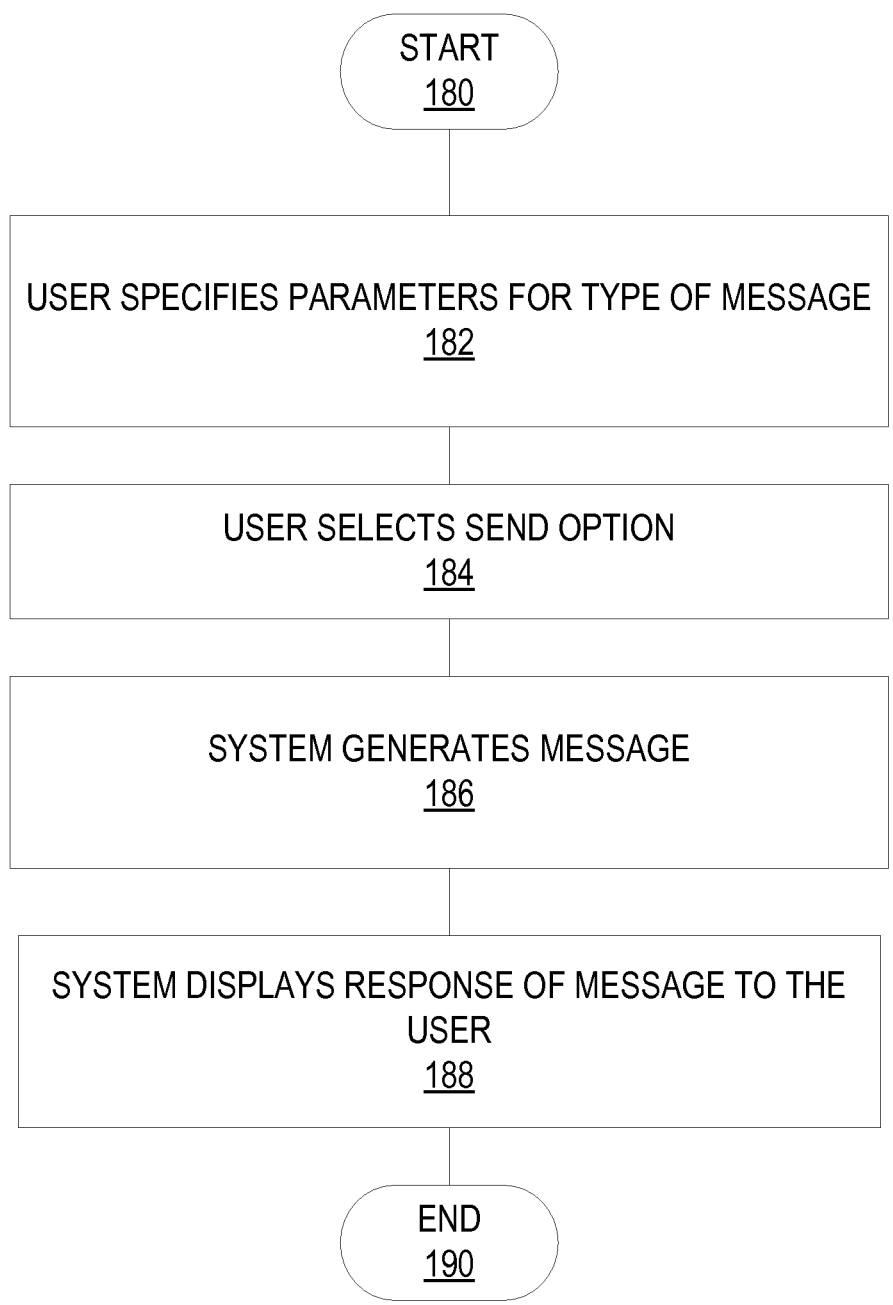
FIG. 12 is a process flow diagram for the system of FIG. 3 demonstrating the stages involved in generating a message and receiving the result.

Referring now to FIG. 12, procedure 180 demonstrates one form of the more detailed stages of system 20 which involve allowing the user to send a particular message to a voice over IP network and see the result. In one form, procedure 180 is at least partially implemented in the operating logic of system 20. Procedure 180 begins at start point 182 with the user specifying the parameters for the type of message (stage 182). The user selects the send option (stage 184), and the system generates the specified message (186). The system then displays the response of the message to the user (stage 188). The process then ends at end point 190.

Turning now to FIGS. 13-14, simulated screens 192 and 198 are shown to illustrate the message generator features of system 20. The SIP Message Generator provides a flexible way to generate single SIP messages based on the user's parameters. The requests and responses from the server are displayed on the Conversation Log window 197. The required fields for a SIP message are demonstrated in the following example:

INVITE sip:pthermos@palindrometech.com SIP/2.0
Via: SIP/2.0/UDP host.palindrometech.com; branch=z9hG4bK77ds
Max-Forwards: 70
To: Mike<sip:support@palindrometech.com>
From: Peter<sip:pthermos@palindrometech.com>; tag=1928301774
Call-ID: a84b4c76e66710@host.palindrometech.com
CSeq: 1 INVITE
Contact: <Sip: pthermos@palindrometech.com>
Content-Type: application/sdp
Content-Length: 142

The SIP Message Generator allows the user to generate messages by specifying the following options 192:
  Methods: INVITE, REGISTER, CANCEL, OPTIONS, BYE and ACK by selecting the drop down method tray.
  Transport: TCP, UDP or TLS (for SIPS) by selecting the drop down transport tray.
  User: the remote user (callee) which is to receive the message.
  The Target Domain/Host where the user may be residing
  The destination port, which by default is 5060 for SIP and 5061 for SIPS.

The body of the SIP Message 194 can include several other fields which are described in detail in the SIP RFC 3261 and other literature available on the Internet. The SIP Message Generator provides the most commonly used headers to generate a message and interact with another SIP component. Finally, the SIP Message Generator has the option to generate multiple copies of the same message by specifying the number of copies, by populating the copies field located at the lower left corner of the interface. This feature can be used to load a proxy server with multiple messages in order to identify its robustness and study the behavior of potential service degradation.

In addition, the user can define an SDP message to be included in the SIP message. The changes in the SDP message section have to be manually defined. The SIP Message Generator will parse and reformat the SDP headers before they are sent to the target host. So the SDP section can include any type of data that the user can enter (e.g. long string of characters) and it will be sent "as-is" within the SIP message.

The SIP Message Generator interface provides description of the values that a field can have. Simulated screen 198 on FIG. 14 depicts an example of a SIP INVITE message that is sent to a SIP proxy, from "root@192.168.1.3", requesting to contact user "alice@192.168.1.5". The SDP portion of the message is automatically populated with the necessary information (e.g. source IP address) to match the SIP headers. This information can also be changed by the user as desired, prior to sending the SIP message. The user's request (such as in black text) and the server's response (such as in red text), are displayed in the conversation log window.

A help module is also provided to offer quick help on common topics that may be useful to a user while performing an assessment. The help section provides the latest version of the SIP RFC 3261, sample SIP messages that can help a novice user to construct SIP messages through the SIP message generator, and references to online resources that discuss SIP including tutorials.

Figure 15:
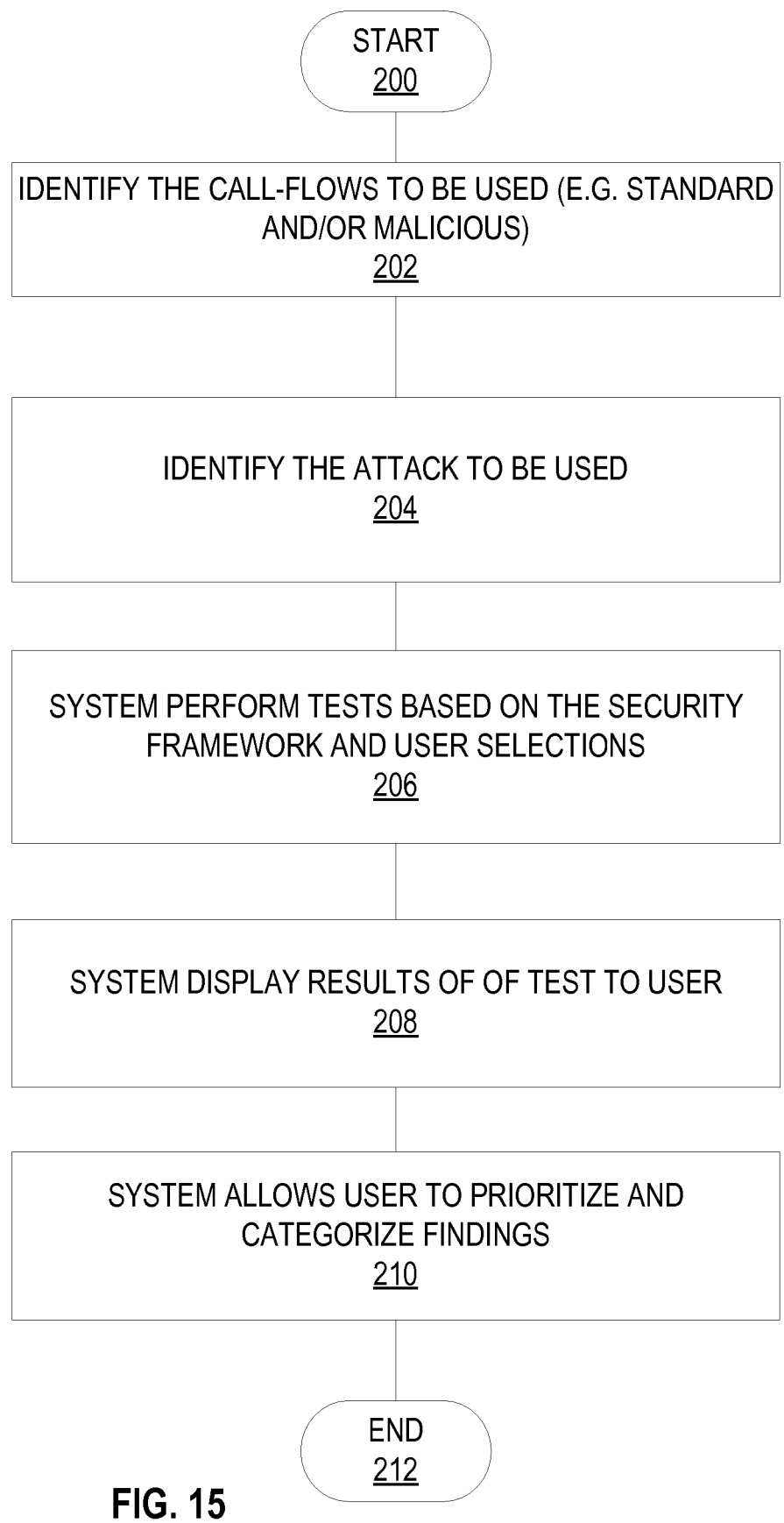
FIG. 15 is a process flow diagram for the system of FIG. 3 demonstrating the stages involved in identifying call flows and attack vectors and providing a system to use the call flows and attack vectors to test converged networks.

Referring now to FIG. 15, procedure 200 demonstrates one form of the more detailed stages of system 20 which involve identifying the call-flows and attack vectors in VoIP networks or between IP and PSTN networks and providing a tool for evaluating such converged networks to identify vulnerabilities. In one form, procedure 200 is at least partially implemented in the operating logic of system 20. Procedure 200 begins at start point 202 with identifying the call-flows in VoIP networks and between voice over IP networks and PSTN (e.g. SS7) networks to be used in the scan (stage 202). In one implementation, two types of call-flows can be generated depending on the scan criteria: standard call-flows and/or malicious call-flows. Standard call-flows represent legitimate call traffic in the VoIP network. Malicious call-flows aim in identifying security weaknesses and vulnerabilities associated with the VoIP network. Either or both of these types of call-flows are designed to evaluate details such as:
  Authentication of signaling and media messages
  Confidentiality of signaling and media messages
  Ability to bypass security controls in order to perform attacks such as eavesdropping, unauthorized access or denial of service
  Ability to perform fraud
  Ability to withstand service disruptions In one implementation, a scientific representation (i.e. using graph theory) of the call-flows is used to help analyze and represent the complex call-flows in VoIP networks and between network elements in IP and SS7 networks in a simpler manner. In such a scenario, the resultant representations are used to formulate algorithms that are integrated in the scanning engine of the security tool.

The attack vectors associated with communication flows in VoIP networks and between IP based networks and PSTN-based (e.g. SS7) networks to be used in the scan are identified (stage 204). Identification of the attack vectors provides the ability to simulate various paths of attack in order to help identify vulnerabilities associated with signaling flows. In addition this capability allows a user to evaluate and optimize the reliability of a target VoIP network. Furthermore, this can be used as a training mechanism to observe attack patterns that may be used by attackers and enhance current intrusion detection systems to identify and alert when such events occur, thus establishing a proactive attack recognition capability.

In one implementation, the security tool follows a security framework which aims in evaluating VoIP and converged networks in the following areas:

Configuration security of NGN components (i.e. management interfaces and protocols) to verify node security.

Robustness inspection to identify vulnerable implementations by generating specially crafted signaling and media messages.

Security evaluation of call flows between IP-Based and PSTN networks to identify patterns associated with threats such as disruption, fraud, unauthorized access and eavesdropping.

Security evaluation of converged services (i.e. service creation, access)

Evaluate the reliability of a VoIP network

The user selects an option to have the security tool use the attack vectors and the security framework to test converged networks (stage 206). The security tool displays the results of the test to the user (stage 208). The security tool allows the user to prioritize and categorize the collected data based on configurable settings (stage 210). The process then ends at end point 212.

Figure 16:
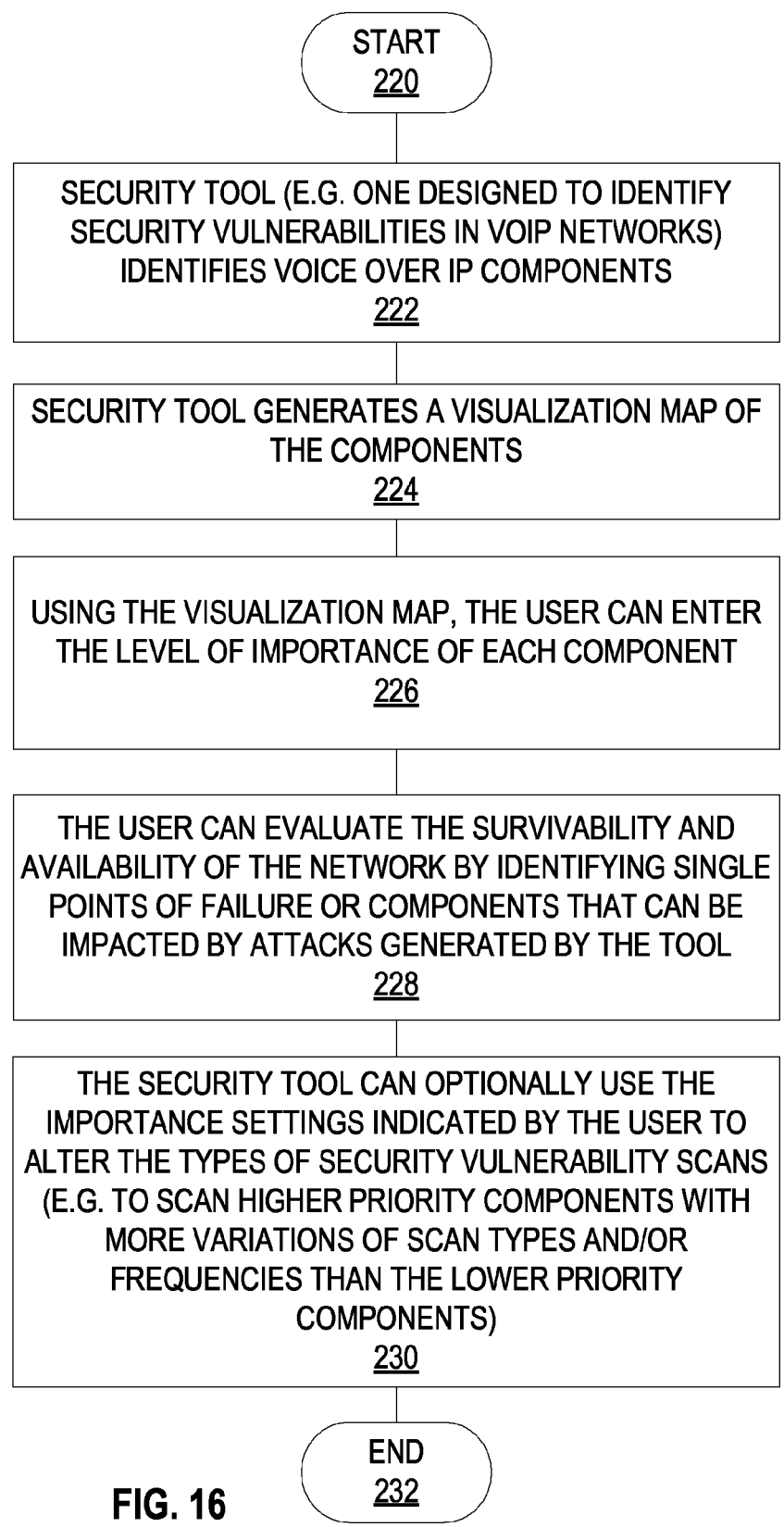
FIG. 16 is a process flow diagram for the system of FIG. 3 demonstrating the stages involved in identifying voice over IP components and generating a resulting visualization map.

Referring now to FIG. 16, procedure 220 demonstrates one form of the more detailed stages of system 20 which involve identifying voice over IP components and generating a resulting visualization map. In one form, procedure 220 is at least partially implemented in the operating logic of system 20. Procedure 220 begins with the security tool identifying VoIP components (stage 222). A visualization map is then generated from the identified VoIP components (stage 224). A user can then enter the level of importance of each component on the visualization map (stage 226). For example, the user might specify that a voice over IP phone is less critical than the voice over IP server. This capability allows the user to evaluate the survivability and availability of a VoIP/NGN network by identifying single points of failure or components that can be impacted by attacks generated by the security tool (stage 228). The security tool can optionally use the importance settings indicated by the user to alter the types of security vulnerability scans performed (stage 230). For example, the security tool could scan higher priority components with more variations of scan types and/or frequencies than the lower priority components (stage 230). The process then ends at end point 232.

In one implementation, a method is disclosed that comprises receiving at least one network identifier that identifies one or more target networks to scan. The at least one network identifier is used to analyze an associated network to determine whether at least one voice over IP network is present. If at least one voice over IP network is determined to be present, then one or more scan options are received that specify how the at least one voice over IP network should be scanned for vulnerabilities. A scan is performed of the at least one voice over IP network based upon the one or more scan options to identify if a particular one or more vulnerabilities is present. A scan result is output, such as on a display.

In another implementation, a computer readable medium is disclosed that has computer-executable instructions for causing a computer to perform various steps. A component discovery tool is provided that is operable to receive input from a user to identify a target network, and to scan the target network to discover at least one voice over IP network present on the target network. A vulnerability scanner tool is provided that is operable to receive at least one scan setting from the user, and to use the at least one scan setting to perform a test against the at least one voice over IP network to attempt to locate at least one vulnerability.

In yet another implementation, a method is disclosed that comprises providing a security tool for detecting vulnerabilities in voice over IP networks. A plurality of voice over IP components are programmatically identified using the security tool. A visualization map is generated of the plurality of voice over IP components. Input is received from a user to specify an importance level of at least one of the plurality of voice over IP components present on the visualization map.

A person of ordinary skill in the computer software art will recognize that the client and/or server arrangements, user interface screen content, and data layouts could be organized differently to include fewer or additional options or features than as portrayed in the illustrations and still be within the spirit of the invention. Furthermore, while many of the examples talk about using the SIP protocol, other protocols could be used with the techniques discussed herein in alternate implementations.

While the invention has been illustrated and described in detail in the foregoing description, the same is to be considered as illustrative and not restrictive in character, it being understood that only the preferred implementations have been described and that all changes and modifications that come within the spirit of the invention are desired to be protected.

What is claimed is:

1. A computer-implemented method, comprising the steps of:
    scanning at least two target systems;
    identifying at least one target system that is voice-over IP enabled;
    receiving at least one scan option, the scan option receives input from a user in which the user specifies parameters for crafting at least one individual message to be sent to the at least one target system, the at least one individual message being used for identifying specific security vulnerabilities within the at least one target system;
    generating the at least one individual message based on the at least scan option;
    sending the at least one individual message through the at least one target system;
    analyzing how the at least one individual message was handled by the at least one target system; and
    identifying the specific security vulnerabilities for at least one target system based on results of the analyzing step.

2. The computer-implemented method of claim 1 wherein the user-defined parameters include a size and type of message.

3. The computer-implemented method of claim 1 further comprising the steps of:
    generating a malformed message of a user-defined size and type; and
    sending the malformed message to the target system as a test for the target system.

4. The computer-implemented method of claim 1 further comprising the steps of:
    generating messages of a plurality of sizes; and
    sending the messages to the target system to detect buffer overflow problems in the target system.

5. The computer-implemented method of claim 1 further comprising the steps of:
    generating a message having SIP, SDP and/or RTP content; and
    sending the message to the target system to test specific issues with at least one SIP component.

6. The computer-implemented method of claim 1 further comprising the steps of:
generating a message having SIP, SDP and/or RTP content; and
sending the message to the target system to generate various attacks on the target system.

7. The computer-implemented method of claim 1 wherein the scan option includes one of method checks, security control checks, vulnerability checks, the ability to check user information, protocol checks, logging options, authentication of SIP messages, registration checks and encryption capabilities.

8. The computer-implemented method of claim 1 further comprising the step of:
using attack vectors and security framework to perform a test against the target system.

9. The computer-implemented method of claim 1 further comprising the step of:
identifying a plurality of voice over IP components;
generating a visualization map of the plurality of voice over IP components; and
receiving input from a user to specify an importance level of at least one of the plurality of voice over IP components present on the visualization map.

10. A system comprising:
one or more processors;
one or more computer-readable storage mediums containing instructions configured to cause the one or more processors to perform operations including:
scanning at least two target systems;
identifying at least one target system that is voice-over IP enabled;
receiving at least one scan option, the scan option receives input from a user in which the user specifies parameters for crafting at least one individual message to be sent to the at least one target system, the at least one individual message being used for identifying specific security vulnerabilities within the at least one target system;
generating at least one individual message based on the at least scan option;
sending the at least one individual message through the at least one target system;
analyzing how the at least one individual message was handled by the at least one target system; and
identifying the specific security vulnerabilities for at least one target system based on results of the analyzing step.

11. The system of claim 10 wherein the user-defined parameters include a size and type of message.

12. The system of claim 10 further comprising the operations of:
generating a malformed message of a user-defined size and type; and
sending the malformed message to the target system as a test for the target system.

13. The system of claim 10 further comprising the operations of:
generating messages of a plurality of sizes; and
sending the messages to the target system to detect buffer overflow problems in the target system.

14. The system of claim 10 further comprising the operation of:
using attack vectors and security framework to perform a test against the target system.

15. The system of claim 10 further comprising the operations of:
identifying a plurality of voice over IP components;
generating a visualization map of the plurality of voice over IP components; and
receiving input from a user to specify an importance level of at least one of the plurality of voice over IP components present on the visualization map.

16. A computer-program product, the product tangibly embodied in a machine-readable non-transitory storage medium, including instructions configured to cause a data processing apparatus to:
scan at least two target systems;
identify at least one target system that is voice-over IP enabled;
receive at least one scan option, the scan option receives input from a user in which the user specifies parameters for crafting at least one individual message to be sent to the at least one target system, the at least one individual message being used for identifying specific security vulnerabilities within the at least one target system;
generate at least individual one message based on the at least scan option;
send the at least one individual message through the at least one target system;
analyze how the at least one individual message was handled by the at least one target system; and
identify the specific security vulnerabilities for at least one target system based on results of the analyzing step.

17. The computer-program product of claim 16 wherein the user-defined parameters include a size and type of message.

18. The computer-program product of claim 16 further including instructions configured to cause a data processing apparatus to:
generate a malformed message of a user-defined size and type; and
send the malformed message to the target system as a test for the target system.

19. The computer-program product of claim 16 further including instructions configured to cause a data processing apparatus to:
generate messages of a plurality of sizes; and
send the messages to the target system to detect buffer overflow problems in the target system.

20. The computer-program product of claim 16 further including instructions configured to cause a data processing apparatus to:
identify a plurality of voice over IP components;
generate a visualization map of the plurality of voice over IP components; and
receive input from a user to specify an importance level of at least one of the plurality of voice over IP components present on the visualization map.

* * * * *